(12) United States Patent
Redpath et al.

(10) Patent No.: US 7,359,876 B1
(45) Date of Patent: Apr. 15, 2008

(54) SIMULATED TRADING SYSTEM WITH AWARDS TO PARTICIPANTS BASED ON PORTFOLIO NET PROFITS

(75) Inventors: Timothy Redpath, Tiburon, CA (US); Frank A. Corsini, Tiburon, CA (US)

(73) Assignee: My Blue Skies, Inc., Tiburon, CA (US)

( * ) Notice: Subject to any disclaimer, the term of this patent is extended or adjusted under 35 U.S.C. 154(b) by 383 days.

(21) Appl. No.: 09/696,538

(22) Filed: Oct. 25, 2000

(51) Int. Cl.
*G06Q 40/00* (2006.01)
(52) U.S. Cl. ............................. 705/37; 705/36; 463/42; 463/9; 379/219
(58) Field of Classification Search ................. 705/37, 705/35, 36, 14; 463/42, 9; 379/219
See application file for complete search history.

(56) References Cited

U.S. PATENT DOCUMENTS

| | | | | |
|---|---|---|---|---|
| 6,161,099 | A * | 12/2000 | Harrington et al. | 705/36 R |
| 6,317,728 | B1 * | 11/2001 | Kane | 705/37 |
| 6,375,466 | B1 * | 4/2002 | Juranovic | 434/107 |
| 6,709,330 | B1 * | 3/2004 | Klein et al. | 463/9 |
| 2001/0049651 | A1 * | 12/2001 | Selleck | 705/37 |
| 2002/0019792 | A1 * | 2/2002 | Maerz et al. | 705/36 |

OTHER PUBLICATIONS

Amy Joyce, Apr. 1, 1999 "Students Play the Stock Market; Game Takes Classes Through Highs, Lows" The Washington Post. Washington, D.C.: Apr. 1, 1999. p. J.07.*

Peter John, "Dealing a share of reality: Technology Computer Games", Financial Times. London (UK): Dec. 29, 1998. p. 12.*

Geoff Smith, "Computer games 'Markets' bonds fun and finance", Boston Herald. Boston, Mass.: Oct. 11, 1992. p. 67.*

Logan Neill, "Students profit from investment game Series", St. Petersburg Times. St. Petersburg, Fla.: Mar. 11, 1999. p. 3.*

(Continued)

*Primary Examiner*—Harish T. Dass
(74) *Attorney, Agent, or Firm*—Townsend and Townsend and Crew; Jay P. Hendrickson (57) ABSTRACT

A simulated trading system allows a user to set up an account with a predefined portfolio of nonzero value, such as a portfolio of a predefined cash amount, and make trades to and from that portfolio. At the end of an investment period, the user is awarded the net profits that user made during the investment period. Alternatively, users that end the investment period with portfolios larger than the starting portfolio are awarded their net profits up to a prespecified maximum and/or a prespecified percentage of less than 100% of the net profits. In one variation, the trades made by the users are actually executed and the securities held in the name of the system operators or the users. The losses incurred by some users, which would be borne by the users themselves in a conventional portfolio system, are borne by the system operators and/or sponsors of one or more investment education programs. The system operators can optionally reduce risk of losses by hedging the trades made by the users. In another variation, the trades are not actually made and any simulated net profits that are paid out to users are funded by advertisement revenue and/or sponsorships.

9 Claims, 5 Drawing Sheets

OTHER PUBLICATIONS

Shyla Sangaran, May 22, 2000 "Getting the fell of trading stocks online", New Straits Times, Kuala Lumpure [Proquest ID 53958533].*

"Phosphorous markets", James T Holter. Futures. Chicago: Feb. 1998. vol. 27, Iss. 2; p. 64, 3 pgs.*

Sandbox.com web page at URL http://www.sandbox.com/finalbell/pub-bin/page?fb_ptm_main+517+prize.html (printed Jan. 15, 2001).

* cited by examiner

Fig. 1

User Info — 112

| USER ID | NAME | ADDRESS | CURRENT PLAN | |
|---|---|---|---|---|
| Fred 3 | Fred Meyer | *** | Plan 23 | *** |
| Jane K | Jane Kolb | *** | Plan 18 | |
| . | . | . | . | |
| . | . | . | . | |

— 200

User Transactions

| USER ID | DATE | TIME | DIRECTION | AMOUNT | SECURITY | PRICE | |
|---|---|---|---|---|---|---|---|
| Jane K | 9/6/2000 | 11:00 AM | Buy | 300 | XYX/cusip | 25 | *** |
| Jane K | 9/7/2000 | 11:05 AM | Sell | 100 | ABC/cusip | ? | . |
| Fred 3 | 9/7/2000 | 11:04 PM | Buy | 200 | XXX/cusip | ? | . |
| . | . | . | . | . | . | . | |

Fig. 5 myblueskies

| Home | Sign In | Register | My Accounts | Investing | Banking/Bills | Loans | Insurance | Planning | Help |

Extended Hours Trading
from 8am to 8pm

DATEK ONLINE myblueskies

The first site to let you
View and manage your
Checking Account
Savings
Credit Cards
Reward Programs
and Investments
All on one screen.
For Free.
And you don't have to move
a single account Take the Tour    Register Now!

About myblueskies
Contact
Search/Sitemap
Job Opportunities
·Privacy Policy
·Security
·Our Guarantee US Markets DJIA    10719.74  +19.61
Nasdaq  3455.84  -113.06
AMEX     937.46    -5.53
S&P     1426.36
Other Quotes
☐  Get Quote Top Business News Ford, Chrysler Report Gaines in
September Sales: GM Reports
3.5% Drop Fed Leaves Interest Rates
Unchanged As Growth Slows European Markets End Higher
in Quiet Trading: Tokyo Stokes
Close Flat Got a game piece?
Click Here Ask the Experts
Free
Credit Report
· GET YOUR FREE
· Credit Report!
· ConsumerInfo.com Great Deals Mortgages
Best Rates Guaranteed Brokerage
Choose the best Broker Banking
Get Unlimited ClickMiles Auto Insurance
Save up to $300

Life Insurance
Get FREE Quotes & Save

SIMULATED TRADING SYSTEM WITH AWARDS TO PARTICIPANTS BASED ON PORTFOLIO NET PROFITS

FIELD OF THE INVENTION

The present invention relates generally to a method and apparatus for providing investment education, and more specifically to a method and apparatus wherein participants in a simulated trading program can make investments risk-free and get rewarded based on performance of their portfolio, with risks being transferred to sponsors and optionally covered by a hedge operation.

BACKGROUND OF THE INVENTION

Many simulated trading systems have been devised to give traders a feel for investing without actually taking on the risks of investing, thus contributing in some way to educating potential investors on investing and trading. Some simulated trading systems are strictly simulation systems, while others are contest systems.

In a simulation system, a participant opens a portfolio and enters trades for stocks and other securities. Those trades are not actually made on behalf of the participant and the participant need not put up funds to pay for the buy trades, however the participant might have to pay a membership fee. Typically, the system operator will simulate a nonzero amount of cash or equities in the portfolio so that the participant has "funds" with which to make buy trades or securities to "sell" to obtain funds for buy trades. The participant's trading is reflected in that participant's portfolio.

In a simulation system, the participant is not at risk for losses to the portfolio. The simulation system operator is also not at risk for the losses, because the trades are not actually made and the funds and the securities contained in the participant's portfolio do not actually have to be backed by the system operator, because the participant never withdraws or gets anything of value from the portfolio, other than an education about the process of investing. Prior to the widespread use of computer systems in simulation systems, an process analogous to interactive simulation of investment called "playing the market on paper" was done by many would-be investors to test their investing skills and to test theories of investment in a risk-free manner. For example, a paper market player might write down some securities and purported quantities and track the performance of the securities to assess performance over time. Note that, as with the simulated trading system described above, there is no risk to the participant because there are no actual investments.

Since there are no actual investments in a straight simulated trading system, there are no gains to be had by the participants, other than gains in understanding and the knowledge that one might have made a sum of money if the actual investments had been made. However, with no actual financial gain and possibly concluding that opportunities were missed when the paper portfolio does well, many potential investors and students of the investment process quickly lose interest in the straight simulated trading system.

Investment contest systems overcome the drawback of not having an upside for the participants. In a contest system, the system operator sets the rules for portfolios and trading and allows participants to set up portfolios, typically starting with an all-cash portfolio of a prespecified amount, and allows the participants to make trades on their portfolio. The trades are not actual trades, in that no shares are bought and sold, as is the case with the straight simulated trading system. The system operator offers prizes to the participants with the best performing portfolios, typically covering the costs of prizes as a promotional cost for other products or services provided by the system operator or their sponsors. For example, a newspaper might sponsor a stock picking contest with prizes in order to promote their newspaper as a source of stock quotes and financial information, or just to raise general awareness of the newspaper.

In a typical contest system, the system operator determines in advance the amount to put at risk by creating a rule that the top performer receives a predetermined sum of money, the second top performer receives a smaller predetermined sum of money, and so on. Thus, the system operator will know ahead of time what the total amount the operator has at risk, regardless of the actual performance of the participants or even the number of participants.

The typical contest system has limited usefulness as an investment education tool, since the optimal strategy for the participant is much different than an actual investor. For example, if an average investor has $10,000 to invest, the investor might allocate $2,000 to five different market sectors to diversify the portfolio. However, in a contest where the only winners are those that have performance exceeding nearly all the other contestants, a more suitable strategy would be to pick one stock that is likely to rise considerably throughout the contest duration. As would be expected, stock picking contest winners are usually the participants who bet heavily on one stock (or as few stocks as the contest rules allow) that rises. The prudent investor that also picked that stock, but diversified, would not be a contest winner except in the unlikely event that all of the several diversified stocks rose considerably.

Of course, there is a system wherein the participants benefit in proportion to their actual profits and has all the right characteristics for learning about actual investing—opening a brokerage account and making actual trades with real money. Of course, this would subject the investor with the full risk of mistakes made during the education process.

Heretofore, however, none of the various simulated trading or education systems have allowed for a user/student to make trades and keep all or a portion of the user's net profits without having put up funds to risk, thereby educating the would-be investor with incentives that are nearly the same as the incentives in an actual investment situation.

SUMMARY OF THE INVENTION

Using the present invention, a simulated trading system allows a user to set up an account with a predefined portfolio of nonzero value, such as a portfolio of a predefined cash amount, and make trades to and from that portfolio. At the end of an investment period, the user is awarded the net profits that user made during the investment period. Alternatively, users that end the investment period with portfolios larger than the starting portfolio are awarded their net profits up to a prespecified maximum and/or a prespecified percentage of less than 100% of the net profits.

In one variation, the trades made by the users are actually executed and the securities held in the name of the system operators or the users. The losses incurred by some users, which would be borne by the users themselves in a conventional portfolio system, are borne by the system operators and/or sponsors of one or more investment education programs. The system operators can optionally reduce risk of losses by hedging the trades made by the users.

In another variation, the trades are not actually made and any simulated net profits that are paid out to users are funded by advertisement revenue and/or sponsorships.

A further understanding of the nature and the advantages of the inventions disclosed herein may be realized by reference to the remaining portions of the specification and the attached drawings.

DESCRIPTION OF THE SPECIFIC EMBODIMENTS

The following description sets forth a detailed example of a basic educational simulated trading system and several variations of the basic system. The system can be operated on many different computing platforms, but one example shown herein operates the system on a client-server network platform, where users connect to a central system to interact and operate aspects of the system, but other variations should be apparent after review of this description.

Figure 1:
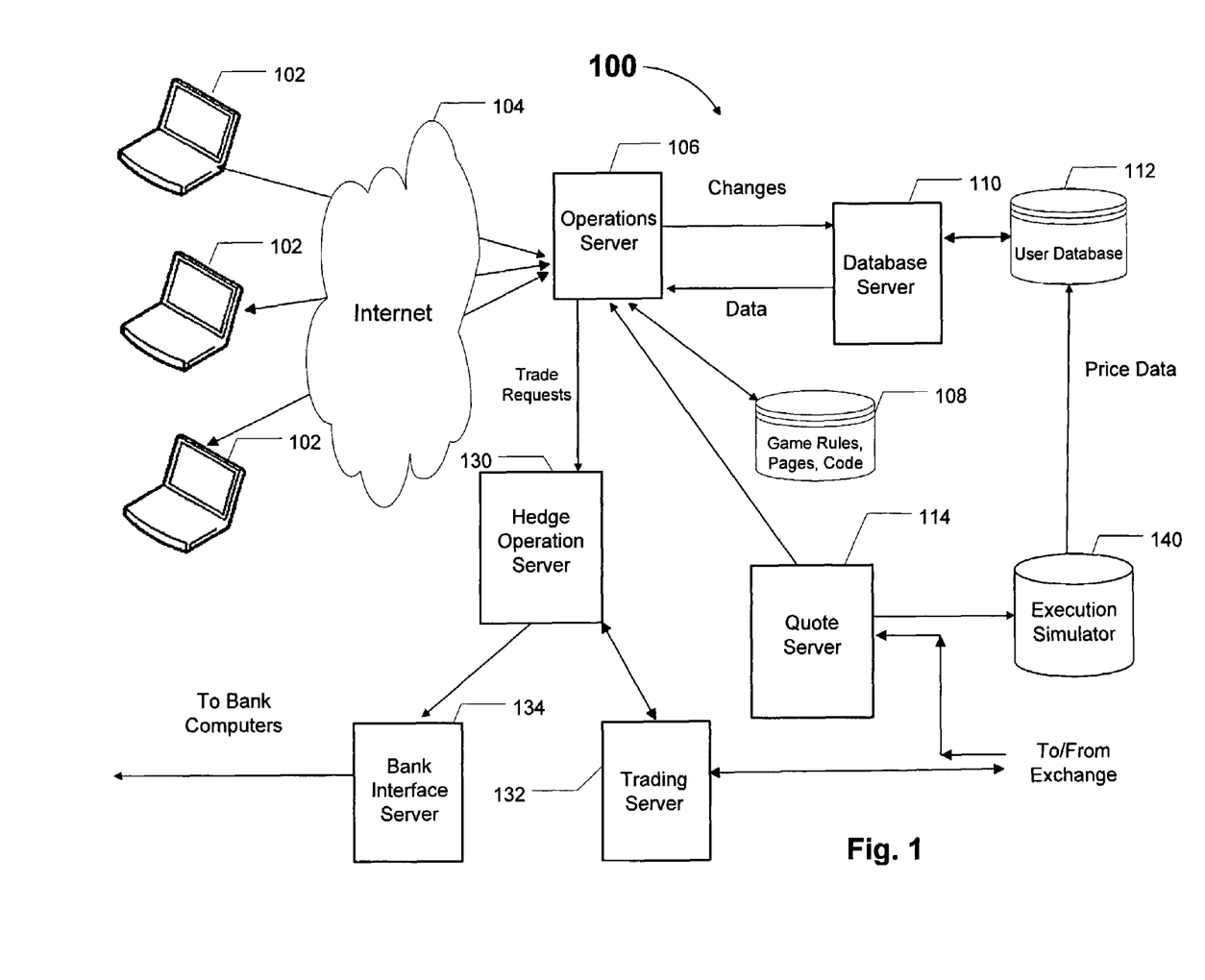
FIG. 1 is a block diagram of a client-server system in which a simulated trading system with educational aspects might be implemented according to one embodiment of the present invention.

FIG. 1 is a block diagram of a trading system 100 according to one embodiment of the present invention. Trading system 100 is shown including a plurality of clients 102, which are computers or computing devices used by system participants to access and interact with other elements of the trading system. Other elements shown include a network 104, an operations server 106 including operations programming in storage 108, a database server 110 coupled to a user database 112, a quote server 114, a hedge operations server 130, a trading server 132 and a bank interface server 134.

Generally, clients 102 interact with operations server 106 over network 104. In a specific implementation, clients 102 are HyperText Transport Protocol (HTTP) clients, operations server includes an HTTP server and network 104 is a TCP/IP network such as the global internetwork of networks known as the "Internet". The interactions that clients 102 perform with operations server 106 include presenting users of clients 102 with information and accepting actions from those users, as explained in more detail below.

In a specific implementation, clients 102 are Internet-connectable computers (desktop computers, laptop computers, palm-sized computers, wearable computers, set-top boxes, embedded TCP/IP clients, and the like), operations server 106 is an Internet-connected server responsive to requests from clients sent to a particular Uniform Resource Locator (URL) designated as being associated with operations server 106. The typical client 102 includes a browser or other HTTP client that is used to provide a user with HTTP access to the Internet and the Web generally and operations server 106 in particular. The particular details of how a particular client 102 connects to operations server 106 and how operations server 106 is selected where operations server 106 is distributed over many physical servers are not shown here, as there exist many such arrangements and the present invention is not limited to any particular client-server arrangement.

Operations server 106 includes, or is coupled to, storage 108 that contains, among other data, rules and information for presentation to users via clients 102, program code and other instructions for operations server 106 as to the operation of a trading program. In a typical implementation, storage 108 might include a plurality of static HyperText Markup Language (HTML) pages of rules and information available to users upon request, possibly including hyperlinks between pages and to pages not maintained on storage 108. The program code can be in any suitable language, such as C++, Java, Dynamic HTML, XML, Active-X, Javascript, PERL, and/or a combination thereof according to understood principles of computer programming. Details of examples of operations embodied in the program code are presented further below.

Operations server 106 is coupled to database server 110 such that operations server 106 can make read, modify, or write requests for or of data maintained in user database 112. Operations server 106 is also coupled to quote server 114 to request and receive quotes of prices for various securities as needed to present to users or in connection with transactions performed by the users. Quote server 114 is coupled to an exchange server (not shown) or other service that provides quotes.

As used herein, "transaction" might refer to an actual or simulated buy or sell trade of a security or other traded item to which trading system 100 relates. A transaction might be an actual transaction, wherein the transactor (usually a user) actually buys or sells for their account, a simulated transaction, wherein the transaction is recorded to the transactor's account but no actual sale or purchase is made, or a hybrid transaction, wherein an actual sale or purchase occurs, but not necessarily for the transactor's account or on the terms specified by the transactor. For example, a user might initiate a buy transaction at a given time for a number of shares of security at specified price/share that changes an entry in that user's account to show the terms of the transaction, but the actual trade is for the account of the system operator. The terms of the actual trade might be for the same or different number of shares, for the same or similar security, for the same or different price, at the same or different execution time.

Operations server 106 is coupled to hedge operations server 130 to send information about transactions being made by users, individually or in the aggregate, to allow hedge operations server 130 to generate requests for trades as needed to hedge risk of payouts for an investment program. Hedge operations server 130 is coupled to trading server 132 that executes trades with an exchange (not shown). Hedge operations server 130 is also coupled to a bank interface server 134 to effect funds transfers as needed to cover the trades made via trading server 132. Hedge operations server 130 can also be programmed to perform a full range of risk management techniques, including those currently in use for hedging, such as the use of securities and derivatives. For example, hedge operations server 130 can be programmed to implement various and multiple investment strategies to neutralize or diminish possible liability and risk to the system operator as a result of investment selections made by members using the system investment simulator.

To the extent that operations server 106 does not cause user database 112 to be updated as a result of transactions made by users, an execution simulator 140 coupled to quote server 114 and user database 112 would perform such updates. One situation where execution simulator 140 might be used is where transactions are priced at times different than their submission time. Thus, where the program rules are such that trades are priced at closing prices, operations server 106 would accept transactions from users and store them in user database 112 without prices assigned to the transactions. When the markets close and closing prices are assigned, execution simulator 140 would scan user database 112 for unpriced transactions, get a closing quote for the security involved and update user database 112 with the prices for those transactions. Alternatively, the functionality of execution simulator 140 could be incorporated into operations server 106.

FIG. 2 illustrates the contents of user database 112. It should be understood that the example shown is just one arrangement of data that would work. As shown there, user database comprises two tables, a user information table 200 and a user transaction table 202. User information table 200 contains information about the user, such as a unique ID in the system, name, address, etc. User information table 200 also contains an indication of which investment program the user is currently in, to be used to identify which users are in which investment programs where there are several investment programs. One reason to have several investment programs is that different programs might have different start and end dates, or different rules on what upside benefits accrue to the user.

User transaction table 202 contains the records for the transactions accepted from users. For each transaction, table 202 maintains data fields such as user ID, date/time of transaction, direction (buy, sell), amount (of shares or units), security ID (e.g., ticker symbol), and price. For some of the transactions, such as transaction 210, prices are included as the price has already been set for that transaction. Other transactions, such as transactions 220, await pricing. Of course, if the rules of the investment program are that prices are set in real-time from quotes at the time the transaction was accepted, then all of the transactions for such investment programs will likely be priced. In some cases, the rules of the investment program are such that the total price (number of shares times price/share) is constrained and would be subject to adjustment upon pricing. For example, an investment program might have a rule that the total price of a buy transaction cannot be more than the amount of available cash in the user's account. If, upon pricing, the total price would exceed the amount of available cash, the number of shares might be adjusted downward to fit the constraint.

After share prices are set, operations server 106 can respond to a statement request from a particular user by gathering that user's user information from table 200 and that user's transactions from table 202 and build a statement for presentation to the user. Such a statement would be useful if the user desires to check performance and status of that user's account.

Other information stored in table 200 might include participant provided demographic and investor profile information such as risk personalities and tolerance/behavior, investment objectives, financial health, net worth, liquid net worth, annual income, obligations, etc. Other information stored in table 202 might include CUSIP numbers to identify securities and transaction cost imputed, if any, as in real world transactions (e.g., commissions and fees).

Figure 3:
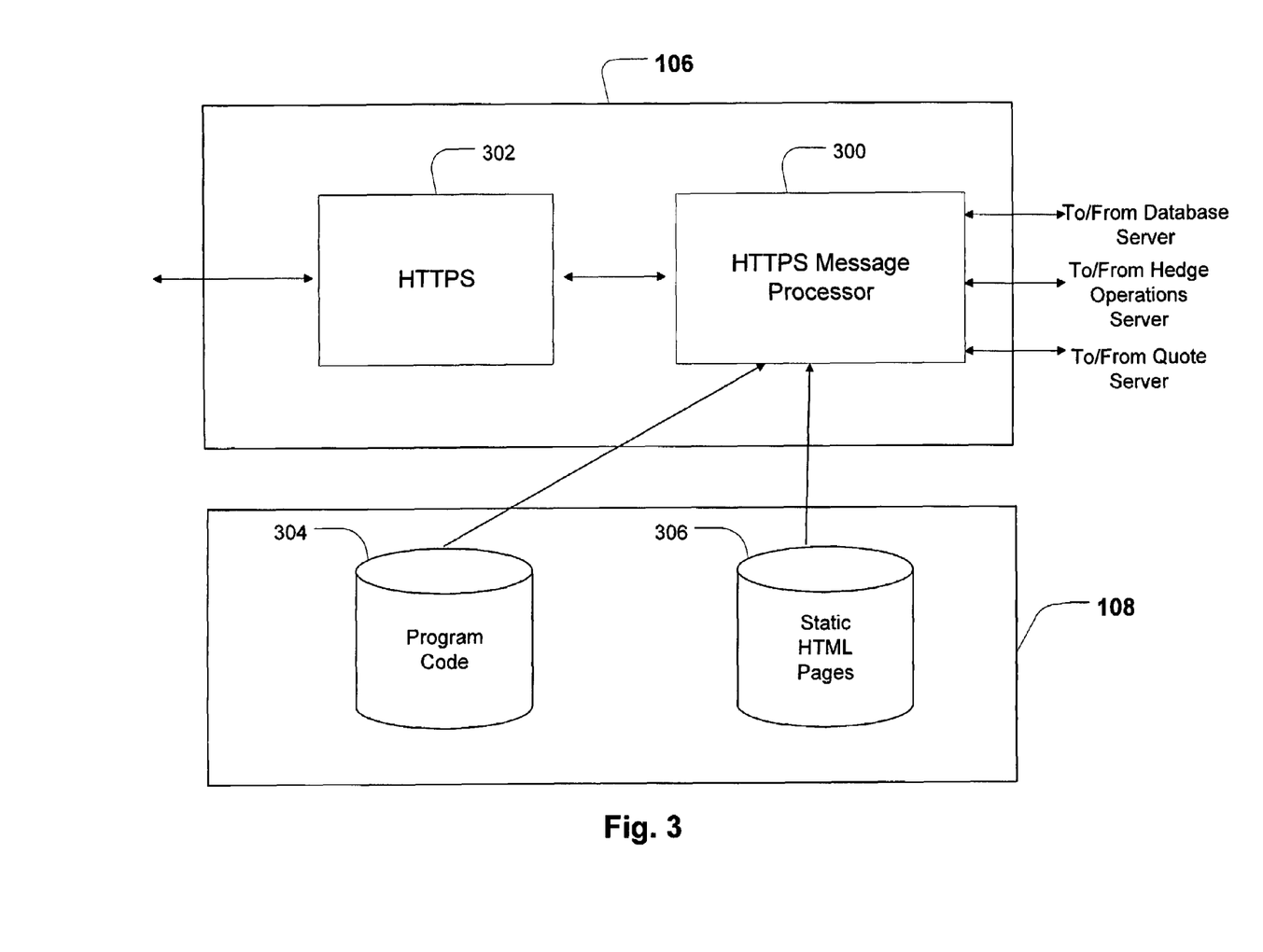
FIG. 3 is a block diagram showing the Web server of FIG. 1 in greater detail.

FIG. 3 shows operations server 106 in greater detail. As shown, operations server 106 includes an HTTP message processor 300 coupled to an HTTPS server 302, storage 304 for program code and storage 306 for static HTML pages. HTTPS server 302 receives HTTP requests from clients 102 (see FIG. 1) and provides them to HTTP message processor 300. HTTPS server 302 can be a conventional Web server. In a typical operation, an HTTP client sends operation server 106 an HTTP message and that message is received by HTTPS server 302, which reformats it as needed and forwards the message to HTTP message processor 300. HTTP message processor 300 takes actions indicated in the program code and the particular response. For example, if the message is a request for a static page, HTTP message processor 300 would retrieve the page from storage 108 and send it to the client, via HTTPS server 302. If the message is a request for a statement, HTTP message processor 300 executes the appropriate instructions from storage 304 to generate an HTML page containing the requested statement and sends that HTML page to HTTPS server 302. HTTP message processor 300 also includes connections to database server 110, quote server 114 and hedge operations server 130 to send and receive messages as indicated by the particular program code being executed by HTTP message processor 300.

As described above, a particular apparatus can be used to implement an investment program according to the present invention. One of ordinary skill in the art would recognize how to implement such a system after review of the details set forth herein as to the operation of the program code and instructions using the data structures presented herein on a variety of other apparatus.

Figure 4:
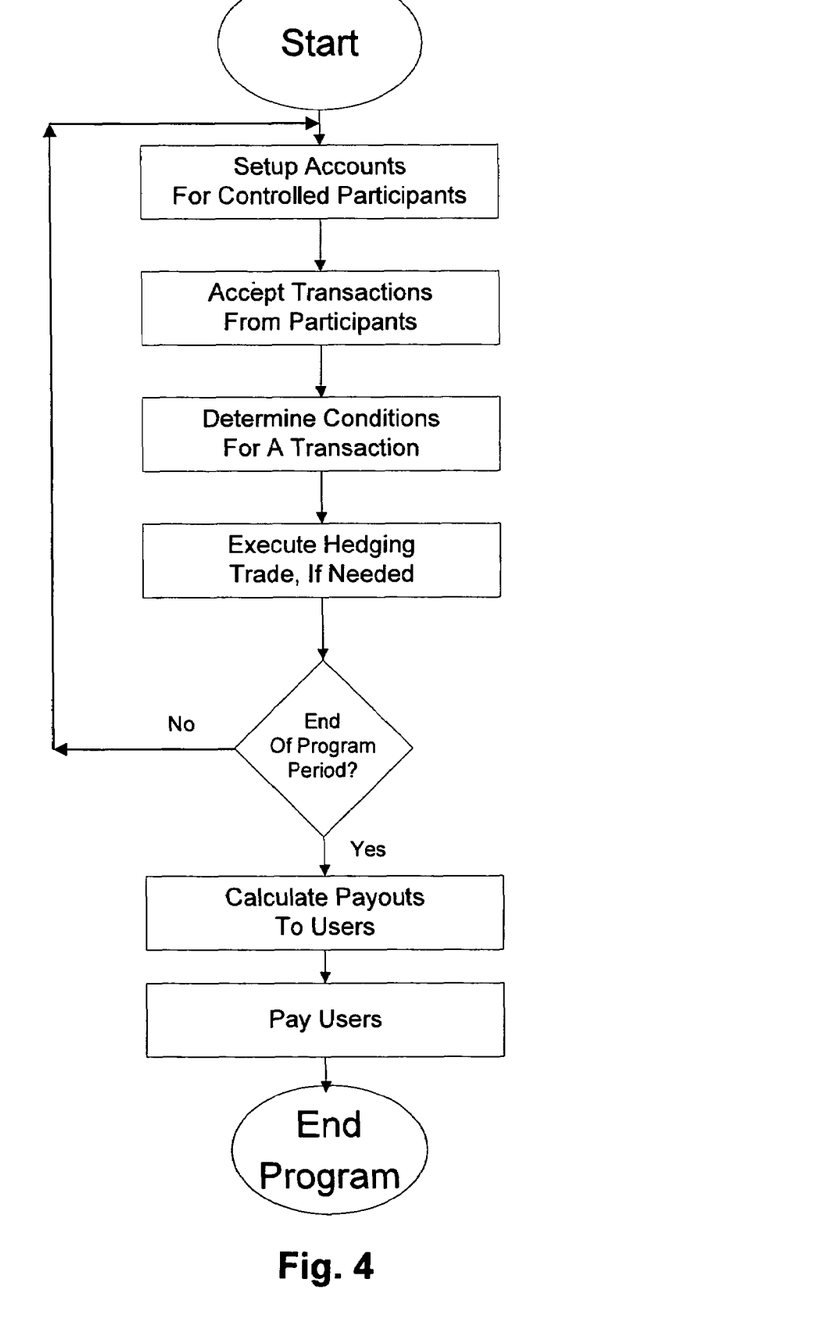
FIG. 4 is a flowchart of a process for operating an educational investment program according to one embodiment of the present invention.

One process possibly embodied in program code in storage 104 will now be described with reference to the flowchart of FIG. 4. As shown there, a process for handling an investment program begins by setting up accounts for participants in the investment program. For example, users might be required to enter identifying information, demographic information and authorization information before operations server 104 executes commands to set up the user as a participant in the investment program.

At setup, an account would be created for the user. The account would be just a data structure, in that the user would have records of buys and sells, but the user would not have an interest in the securities listed in the user's portfolio, except in those investment programs where the user makes trades on his or her own account. While such an arrangement is not impossible using the system, an investment program wherein a user trades for their own account but is shielded from losses by the system operator is illegal in many jurisdictions and should, of course, not be used there.

In a preferred embodiment, the participant might or might not have an interest in the participant's trades, but the participant starts with an account having a prespecified content, such as $1,000 of cash with the understanding that at the end of the investment program, if the portfolio is valued at more than $1,000, the participant receives all or part of the excess value and, if the portfolio is valued at less than $1,000, the participant receives nothing and is not liable to make up the $1,000 value in the portfolio. In the typical investment program, transactions that would reduce the value of a portfolio below zero are not permitted so the maximum loss that the system operator would incur if the trades corresponding to each transaction are made would be $1,000 per participant.

Once the accounts are setup, participants can initiate transactions to buy or sell securities. Nothing about the system definitely requires a prohibition on uncovered shorting, such transactions should be prohibited if a portfolio value is not to fall below zero under any circumstances. The transactions are accepted if the necessary conditions of the investment program are met. Once a transaction is accepted, it is posted to the user's account and a hedging trade is initiated, if hedging trades are used.

At the end of the program period, transactions are no longer accepted and payouts are calculated. For example, if the program period is one year, accounts are set up and participants generate transactions throughout the following year and then stop. An example of a set of possible payout rules is that each participant that has a portfolio in excess of the initial amount ($1,000 in the above example) receives a payout of the excess, but not more than some upper limit, such as $3,000. Thus, a participant with an ending portfolio value of $500 would receive nothing, a participant with an ending portfolio value of $2,200 would receive $1,200 and a participant with an ending portfolio value of $5,000 would receive $2,000 (the difference between the upper limit and the initial amount).

If the participants are allowed to generate transactions that are as varied as stock trades are today, which should be the case if the participants are to be exposed to as real an investment situation as possible, then it would be intractably difficult to calculate ahead of time the risk the system operator takes, which would be the total payout to all participants in an investment program. The risk can be hedged by the system operator taking positions that are net opposite the sum total of the positions taken by the participants, except that the system operator will end up with a net loss for all those portfolios that end up being valued at between zero and the initial amount. This net loss can be offset by limiting the payouts to those participants that are in the money so that a perfect hedge would have a net positive position against those participants that made more on their portfolio that is being paid out.

Once hedged, the maximum net loss is known ahead of time, namely the number of participants times the initial amount plus transaction costs. This maximum net loss can be reduced somewhat during the investment period by liquidating the positions that correspond to losing participants, so that the hedging is only of the in-the-money participants. That way, unless a losing participant suddenly loses his or her entire portfolio, the system operator will not experience a loss of the amount in that participant's starting portfolio.

Figure 5:
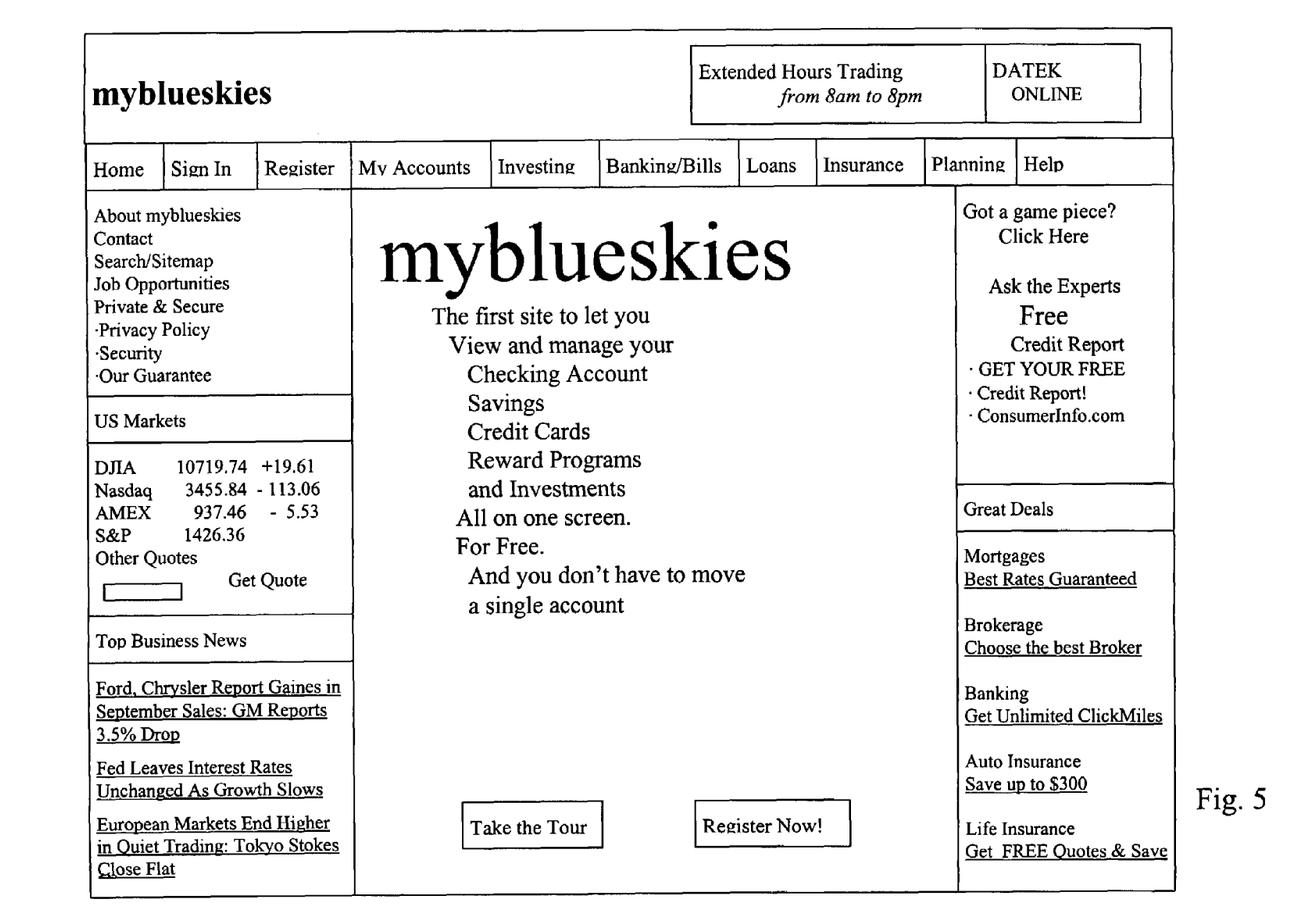
FIG. 5 is a screen shot of a page presented to a participant in the educational investment program.

If other revenues, such as sponsorships or advertising revenues for advertisements included in pages served by the operations server to clients, can be had up to the amount of the maximum net loss, the system operator can operate the trading system without great risk while still providing a valuable educational tool to the participants. As an example of how an advertisement might be integrated into the program, a screenshot 500 shown in FIG. 5 provides the user with information and includes an advertising banner 502.

In some embodiment, the preselected amount put into the portfolio is a function of actions taken by the participant. For example, the portfolio might start with an initial amount of $500 and the system operator adds some amount to the portfolio each time the user visits the system operator's site, or performs some other desired action. Thus, the system operator might add $10 for each visit to their site, up to a total of $500 to be added to the initial $500. In this embodiment, the payout for the participant might be the net gains over the amount put in the portfolio or the net gains over some maximum that could be put in the portfolio. For example, if one participant starts with $500 in a portfolio and gets another $250 added by performing desired actions (visiting a Web site, patronizing a sponsor, making a purchase, filling out a survey, etc.) the net gains could be the amounts over the $750 that was added to the portfolio or the amounts over the $1000 that could have been added to the portfolio.

Instead of increasing the amount put in response to desired participant actions, the system operator might configure the rewards to be such that a participant that performs more desired actions gets preferential calculation of awards. For example, the base award might be calculated as 50% of the net award or no more than three times the initial amount, but if the participant performs desired actions, that participant's percentage of the net gains might increase or the upper limit on rewards might increase.

Another source of revenue to offset the at risk amount is to provide services and information to users from sponsors for a fee, where the particular services and/or information are determined by demographics provided by the user or based on actions taken by the user. The services and/or information might be online services/information or offline services/information.

Yet another source of revenue is referrals to actual brokers, possibly as a function of the transactions made. For example, if a user makes many trades in technology stocks, that user might be referred to a broker specializing in technology stocks.

In addition to advertisements delivered to specific demographics, the system will also be able to deliver advertisements and opt-in activities based on demographics or trading patterns and such deliveries will be to actual, verified participants. The activities might include email messaging, banner ads, sponsorships or co-sponsorships that match or otherwise enhance the value of payouts.

Some methods of offsetting the risk do not involve outside revenue but are generated by the investment program itself. For example, if the system operator hedges all net transactions, the rules of the investment program might include a nominal added spread and/or the inclusion of a commission fee in calculating returns for a portfolio. In addition to being a way to offset gains, in effect outperforming the gaining participants to offset the losing participants, including commission effects makes the process of trading more accurate and therefore more educational.

Another method of offsetting risk is to price transactions at a fixed time, such as at the closing of the market, but follow the transactions in real time and make hedging trades at any time of day when the hedging operations server determines that a hedge is needed to offset user activity and the hedge would be better at a time other than the closing of the market.

Yet another method of reducing risk is to limit the program to a selected set of securities that are not known for volatility, or require diversification that reduces overall volatility.

With the feature that participants participate in the upside gains but do not risk the downside, there is potential for fraud. For example, a user intent on fraud might set up two accounts that trade oppositely, i.e., whatever one account buys or takes calls on, the other sells or takes puts on, such that one of the two accounts will be certain to lose value while the other of the accounts will be certain to make money. Since the fraudulent user is not on the hook for the losing account, the user will net make money without actually participating in the educational nature of the investment program.

To avoid this scenario, and also to provide a good measure to advertisers as to the qualifications of the users, the simulated trading system should take steps to authenticate users and prevent one user from opening more than one account or multiple users colluding. One measure is having a nominal membership fee.

Preferably, collusion among participants should be prohibited and participants that are caught colluding would be disqualified. To limit exposure of undetected collusion, trades might be limited so as to disallow trades in small cap stocks, IPO's, index funds, futures, options, derivatives and other manipulable securities.

A procedure to verify the identity of individuals who enroll as potential participants in an investment program such as the one described below might be used to ensure that only real individuals are enrolling under their true identities and that the user base is not populated with aliases or computer programs posing as people ("bots"). In this procedure, the trading system provides an enrollment page to potential participants that collects information from the potential participants. Such information might include name, primary residence street address, city, state, zip, gender, birth date, home phone number, name of individual the home phone service is listed under, social security number, driver's license number and state of issuance, number of months living at the current address and prior address if recently moved. Additionally a credit card number might be required. Even if the user is not charged a participation fee or other fees that would be charged to a credit card, the mere requirement to include accredit card number has been shown to greatly reduce the use of aliases and bots.

The user-provided enrollment information can be compared with industry databases to detect fraudulent applications for enrollment. Multiple databases could be used to verify and crosscheck the demographic elements of the enrollment information, such as cross-checking name with social security number, street address with phone number, name with street address, birth date with year of issuance of social security number.

If these matches are positive, then the enrollment can be approved automatically. If the matches are not adequate, then the enrollments can be declined automatically (which is the least expensive) or a "Pending" procedure can be established which would allow for certain manual checks and verifications to occur. The degree to which a "Pending" decision status is employed will depend upon how the system operator wishes to handle indeterminate applications.

In conjunction with the educational aspects, participants that have portfolio values fall below some amount, such as 75% of the initial amount, might be enrolled in a special online investment school with educational mentoring and profiling. Should the member decrease to a level, say 50% of the initial amount, the account might be taken over to rebuild the account's financial health.

Offsetting Risk

Since the system operator, by agreeing to award participants an amount that is determined by the participants' trading and not a fixed contest amount, the system operator bears the risk that all participants will do well. Of course, if all participants do well and are awarded their net profits, the system operator can offset the risk of payouts by taking a matching position that matches each of the participants' trades. Then, the system operator is out no more than the transaction costs, which might be predictable if each participant's trading frequency is limited by the system.

This trade matching process would not cover all of the system operator's risks, however, if there are some participants that do not do well, as the system operator would lose money on the trades that match a losing participant's trades, but the losing participant does not lose the money. One way to limit the difference between what is paid out to participants and what is made by the system operator in matching trades is to match only the trades of those participants that are "in the money" and sell the holdings that match a participant when the participant falls below the initial portfolio amount.

In one analysis of the program, the system operator effectively grants at-the-money call options to the participants. For example, assume that a participant starts with a portfolio of $1000 and "invests" it all on 100 shares of XYZ selling at $10/share at the start of the investment period. Because the participant does not have to pay for losses, but just wins the net gains, this is the equivalent of the system operator granting the participant an option to buy 10 shares at $100 apiece at the end of the period (or when the participant chooses to "sell" the shares). By placing certain restrictions on the membership fees, time horizons and stock universes, the value of those options can be kept to a minimum, thus minimizing the program cost to the system operator. For example, as illustrated using the Black-Scholes formula, the cost of the options can be reduced by using a shorter time period for the investment period or excluding all securities above a certain cutoff volatility.

In one variation, membership fees are offset by sponsor benefits. For example, each participant might pay a $100 membership fee and get, in addition to being a participant in the simulated trading system, a $100 gift certificate towards the purchase of a car, where the car manufacturer is a sponsor of the program or provides the gift certificates to the system operator at a discount. Instead of a gift certificate, the participants might receive a $100 credit for online shopping, or the like.

The above description is intended as a thorough teaching of how to make and use a trading system and several variations. The above description is not intended to be exhaustive of the possibilities. For example, the above description generally assumes that the interconnecting media between the users and the trading system is the Internet, but the Internet can be replaced with other media without departing from the scope of the invention, such as a non-TCP/IP network, a Local area network (LAN), and intranet, a virtual private network (VPN), or a wireless-access protocol (WAP) network. Also, thus, the above description should not be construed to be limited to particular computing devices.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A method of operating a trading system on a computing platform, the method comprising:
 a) using a simulated trading system to:
  set up an account representing a predefined portfolio of nonzero value for each of a plurality of participants, each of the accounts having no actual monetary value;
  simulate trades by the plurality of participants;
  apply the simulated trades to the portfolios of the trader participants to thereby update the representative value of the predefined portfolio; and
  award each participant an item of value in an amount having a monetary value that is equal to all of any representative net profits that the participant simulated over an investment period; and b) sending information about the simulated trades from the simulated trading system to a hedge operations server, said information for use by the hedge operations server in executing actual trades as needed in order to hedge the risk of needing to earn money to provide the items of value.

2. A method in accordance with claim 1, wherein the item of value is an amount awarded at the end of the investment period that is equal to all of any representative net profits the participant simulated during the investment period up to a predetermined maximum award.

3. The method of claim 1, wherein the item of value is an amount awarded at the end of the investment period that is a percentage of less than 100% of any representative net profits the participant simulated during the investment period.

4. The method of claim 1, further comprising a step of offsetting risk to a system operator by one or more of sponsorships, advertising and participant fees.

5. The method of claim 1, wherein the actual trades by the system operator are at least partly based upon the simulated trades of the participants.

6. The method of claim 1, wherein the actual trades by the system operator are entirely based upon the simulated trades of the participants.

7. The method of claim 1, wherein the actual trades by the system operator are at least partly different than the simulated trades of the participants.

8. The method of claim 1, wherein the actual trades by the system operator are entirely different than the simulated trades of the participants.

9. A trading system, comprising:

a) a simulated trading system having an operations server for setting up an account representing a predefined portfolio of nonzero value for each of a plurality of participants, each of the accounts having no actual monetary value;

simulating trades by the plurality of participants;

applying the simulated trades to the portfolios of the trader participants to thereby update the representative value of the predefined portfolio; and awarding each participant an item of value in an amount awarded at the end of the investment period that is equal to all of any representative net profits the participant simulated during an investment period; and b) an actual trading system having a hedge operations server, which is coupled to the operations server and to a trading server, said hedge operations server using information about the simulated trades for executing actual trades as needed in order to hedge the risk of needing to earn money in order to provide the items of value.

* * * * *